United States Patent [19]

Feniak

[11] 3,943,093

[45] Mar. 9, 1976

[54] PROCESS FOR MINIMIZING HEAT-PROMOTED INTERACTION BETWEEN BROMINATED BUTYL AND CARBON BLACK DURING COMPOUNDING

[75] Inventor: George Feniak, Wyoming, Canada

[73] Assignee: Polysar Limited, Sarnia, Canada

[22] Filed: June 28, 1974

[21] Appl. No.: 484,069

[30] Foreign Application Priority Data

Oct. 17, 1973    Canada................................. 183638

[52] U.S. Cl.... 260/42; 260/31.2 MR; 260/31.8 DR; 260/42.31; 260/42.47; 260/42.57; 260/45.7 R; 260/45.7 RT; 260/85.3 H
[51] Int. Cl.².... C08K 3/38; C08K 3/04; C08K 5/09
[58] Field of Search .... 260/42, 42.31, 42.47, 42.57, 260/85.3 H, 45.7 R, 45.7 RT

[56] References Cited

UNITED STATES PATENTS

| | | | |
|---|---|---|---|
| 2,962,474 | 11/1960 | Fusco et al. | 260/42.47 |
| 3,009,904 | 11/1961 | Serniuk et al. | 260/85.3 H |
| 3,177,267 | 4/1965 | Luvisi | 260/45.7 R |
| 3,345,326 | 10/1967 | Chang et al. | 260/45.75 |
| 3,542,727 | 11/1970 | Saville | 260/45.7 |

*Primary Examiner*—Donald E. Czaja
*Assistant Examiner*—H. H. Fletcher
*Attorney, Agent, or Firm*—Stevens, Davis, Miller & Mosher

[57]    ABSTRACT

A process is described for reducing the heat promoted interaction of bromobutyl and carbon black by the incorporation of an interaction retarding agent selected from boron compounds containing oxygen bonded to boron, anhydrides of carboxylic acids and channel carbon black.

1 Claim, No Drawings

PROCESS FOR MINIMIZING HEAT-PROMOTED INTERACTION BETWEEN BROMINATED BUTYL AND CARBON BLACK DURING COMPOUNDING

This invention is directed to a process for reducing the heat-promoted interaction of brominated butyl rubber and carbon black.

The heat-promoted interaction of rubbers with the carbon black fillers is well known in the rubber industry. A considerable art exists directed to increasing the heat-promoted interaction for the purpose of obtaining compounds wherein full advantage can be taken of the presence of both the rubber and the carbon black and the synergism between the two components.

It has now been discovered that the heat-promoted interaction of brominated butyl rubber and carbon blacks other than channel carbon black can be reduced by the addition of an interaction retarding agent as hereinafter defined.

This invention has as an objective an improved process for reducing the heat-promoted interaction of brominated butyl rubber and carbon black. A further objective is the reduction of said interaction in conventional rubber mixing equipment at temperatures in excess of about 135°C by the addition of an interaction retarding agent.

Brominated butyl rubber is the bromination product derived from butyl rubber which is a polymer comprising a major proportion of a $C_4$–$C_8$ isoolefin, for example isobutylene, and a minor proportion of a $C_4$–$C_8$ conjugated diolefin, such as isoprene. Commercially available butyl rubber is a polymer which contains from 95–99.5 weight % of isobutylene and from 0.5 to 5 weight % of isoprene, said polymer being prepared by the well known low temperature cationic polymerization process. A preferred butyl rubber contains from 97–99 weight % of isobutylene and from 1 to 3 weight % is isoprene. The bromination of butyl rubber is a well known process wherein butyl rubber, either as a solid or in solution in an inert solvent, is contacted with a source of bromine, including elemental bromine or bromine-containing compounds which release the bromine under suitable conditions, the amount of available bromine usually being controlled within fairly closely defined limits. The brominated polymer may contain from about 0.5 to about 15 weight per cent bromine. The brominated butyl rubber is known as bromobutyl. Bromobutyl contains not more than 3 atoms of bromine per carbon-carbon double bond present in the original copolymer and preferably it contains from 0.5 to 5 weight per cent of bromine. The bromine content of the most preferred bromobutyl is from 1.5 to 2.5 weight per cent of bromine.

Brominated butyl rubber may be used in various applications where rubbers are generally used. It is particularly useful in applications involving adhesion to or covulcanization with the more highly unsaturated rubbers such as natural rubber and the unsaturated synthetic rubbers including polyisoprene, polybutadiene and SBR, and it may be used in adhesion to or blend with other lowly unsaturated rubbers such as the EPDM polymers. These uses are generally achieved as a result of the high reactivity during the vulcanization process of the bromine bonded to the butyl rubber backbone. Such applications usually require that the rubber be mixed, prior to vulcanization, with conventional compounding ingredients including fillers such as carbon black, clays, etc., extender oils and plasticizers, waxes, antioxidants and other processing aids.

It is well known in the art that the mixing of brominated butyl rubber and carbon black can, under certain conditions, lead to a high degree of interaction of the rubber and the black prior to vulcanization. In order to achieve this high degree of interaction, it is necessary that the rubber and the black be mixed under conditions of high shear and high temperature, optionally in the presence of promoters for the interaction. Generally, the mixture of rubber and black is subjected to a temperature of at least about 135°C, especially at least about 150°C and frequently as high as about 180°C while being masticated. Promoters for the interaction include chlorinated phenols, elemental halogen and certain chlorinated amine-containing compounds. The advantage of producing mixtures of rubber and black under conditions when the interaction is enhanced are claimed to include that the vulcanizates of such mixtures possess low hysteresis properties. The degree of interaction is influenced by the type of carbon black used, some blacks showing a higher degree of interaction with the rubber than do other blacks.

Under certain conditions, the occurrence of such an interaction between the brominated butyl rubber and carbon black can be disadvantageous. It is well known in the art that the result of the interaction is an increase in the level of rubber and black bound together which is not readily separable. Depending on the degree of interaction which has taken place, the compound so produced can be difficult to process. The difficulty in processing of the compound can be disadvantageous depending on the particular method of operation and especially if the compound has to pass through other processing equipment having a low rate of shear.

It has been found that brominated butyl can interact depending upon the shear conditions and the type of black, with certain carbon blacks under conditions when the temperature is above about 135° to about 150°C in a mixer which generates shearing action. As a result of this it is sometimes necessary to maintain mixing temperatures below about 150°C and definitely below about 165°C.

By using the process of this invention, it is possible to mix brominated butyl rubber and carbon black, in the absence of promoters, at temperatures up to about 180°C without excessive interaction of the rubber and black, by adding to the mixture an interaction retarding agent. The interaction retarding agent is selected from at least one of boron compounds having at least one oxygen atom chemically bonded to boron, anhydrides of aliphatic and aromatic carboxylic acids and channel carbon black. By using the process of this invention, brominated butyl rubber and carbon black may be mixed, without incurring excessive rubber-black interaction, at relatively high temperatures and at relatively high rates of shear.

The mixing of rubber and carbon black is well known in the art and may be achieved by using two roll mills, wherein the rate of shear may be controlled by one or both of the gap between the mill rolls and the relative rate, one to the other, of rotation of the mill rolls and by using internal mixers, such as Banbury mixers. The mixture is subjected to a shearing action, which contributes to good dispersion of the solid carbon black in the rubber, at suitable temperatures, which influence the viscosity of the rubber. In many instances, the rubber black mixture may be subjected to further treatments and the curing agents may be added at a further stage in the process.

The interaction retarding agents of this invention include boron compounds having at least one oxygen atom chemically bonded to boron. Suitable such boron compounds include boron oxide, boric acid (i.e. orthboric acid and metaboric acid) and borate esters of the general formula $R_3O—B(OR_2)—OR_1$ wherein $R_1$, $R_2$ and $R_3$ may be the same or different and are hydrocarbyl radicals having 1–12 carbon atoms, including alkyl, cycloalkyl, aryl, aralkyl alkylaryl and alkenyl radicals. Preferred borate esters are those in which $R_1$, $R_2$ and $R_3$ are hydrocarbyl radicals having 1–6 carbon atoms, including trimethyl borate, tri-n-butyl borate, triphenyl borate and tricyclohexyl borate.

The interaction retarding agents of this invention include anhydrides of aliphatic and aromatic acids. The aliphatic carboxylic anhydrides include the anhydrides of the $C_2$–$C_6$ fatty acids, especially acetic anhydride, and include succinic anhydride, glutaric anhydride, maleic anhydride, crotonic anhydride and the aromatic carboxylic anhydrides include phthalic anhydride and trimellitic anhydride.

The amount of the boron compound or of the acid anhydride interaction retarding agent which may be used to control the interaction of the rubber and the black is within the range of 0.1 part to 2 parts by weight per 100 parts by weight of rubber, preferably within the range of 0.5 to 1 part by weight per 100 parts by weight of rubber. Depending upon the amount of interaction retarding agent added to the rubber black mixture, it is possible to control the extent of interaction of the rubber and the black from almost complete elimination of the interaction to only a minor reduction of the extent of the interaction. A further consideration is that the amount of interaction retarding agent should be such as to not seriously affect the subsequent vulcanization reaction.

A further interaction retarding agent is channel black. The main types of carbon blacks in commercial use for reinforcing rubbers are furnace blacks, thermal black and channel blacks, all well known in the art. Channel black is characterized by having a low (i.e. acid) pH, a very low ash level and a relatively high chemisorbed oxygen content. When channel black is the only black mixed with the brominated butyl rubber, essentially no rubber black interaction occurs. The addition of a small amount of a channel black to a mixture of brominated butyl rubber and a carbon black other than channel black reduces the rubber-black interaction which otherwise occurs in the absence of the channel black. The amount of channel black used in admixture with other carbon black may be from 2 parts by weight up to 35 parts by weight per 100 parts by weight of rubber, a preferred amount being from 5 parts by weight to 20 parts by weight of channel black per 100 parts of rubber.

A simple method of determining and following the interaction of rubber and black is to determine the Mooney of the mixture. This can readily be achieved by preparing a mixture of the rubber and black, putting the mixture into a Mooney machine at the desired temperature, putting the rotor into operation and following with time the Mooney reading. For a mixture which exhibits essentially no interaction, the Mooney reading will slowly fall over a period of a few minutes from an initial peak to a steady value. For a mixture which does exhibit interaction, the Mooney reading will slowly fall over a period of a few minutes from an initial peak and will then start to show an increase. The rotor of a Mooney machine is known to generate only a relatively low rate of shear but this is sufficient to clearly demonstrate the presence or absence or control of interaction between the rubber and carbon black. When the temperature of the Mooney machine is set at 135°C essentially no interaction can be observed between bromobutyl and carbon blacks; however, when the temperature is set at 160°C, interaction can clearly be seen to varying extents depending upon the nature of the carbon black used in the mixture. Similarly, when the rubber-black mixture is prepared in a Banbury mixer, the minimum temperature at which interaction can occur is found to be at about 135°C.

The invention is illustrated by the following examples which are not to be construed as limiting the scope of the invention. All parts are parts by weight unless otherwise specified.

EXAMPLE 1

Mixtures of 50 parts of a carbon black and 100 parts of a halogenated butyl rubber or butyl rubber, each mixture also containing 1 part of stearic acid, were prepared on a two roll rubber mill using a temperature of 30°C and milling the mixture sufficiently to obtain a good dispersion of the black throughout the rubber. A portion of the mixture was put into a Mooney machine at a temperature of 160°C, allowed to warm up for one minute and the rotor then turned on at the standard 2 rpm and the Mooney reading recorded with time. The results are shown in Table I. The bromobutyl rubber had a raw polymer Mooney (ML–1 + 12 at 125°C) of 45 and contained 2.0 weight per cent bromine. The chlorobutyl contained 1.1 weight per cent of chlorine and had a raw polymer Mooney (ML–1 + 12 at 125°C) of 49. The butyl rubber had a raw polymer Mooney (ML–1 + 12 at 125°C) of 50 and contained 1.6 mole per cent unsaturation.

TABLE I

| Rubber Carbon Black | Bromobutyl Channel | Bromobutyl HAF | Bromobutyl SRF | Bromobutyl FEF | Chlorobutyl FEF | Butyl FEF |
|---|---|---|---|---|---|---|
| Mooney at 1 minute | 83.5 | 64.5 | 52 | 53 | 56 | 46.5 |
| 4 minutes | 75 | 59.5 | 49 | 59 | 54 | 41 |
| 8 minutes | 73 | 63 | 52 | 118 | 53.5 | 39.5 |
| 12 minutes | 73 | 65.5 | 60.5 | 178 | 53.5 | 39.5 |
| 16 minutes | 70 | 68 | 95 | >178 | 53.5 | 39 |
| 20 minutes | 66.5 | 72.5 | 124.5 | >178 | 53.5 | 39 |
| 24 minutes | 64.5 | 79 | 141 | >178 | 53.5 | 38.5 |
| 28 minutes | 63 | 85.5 | 143 | >178 | 53 | 38.5 |

The results in Table I show that channel black does not show an interaction with bromobutyl whereas HAF, SRF and FEF blacks do show varying degrees of bromobutyl-black interaction. On the other hand, chlorobutyl and butyl rubber, when mixed with FEF black which showed a very high degree of interaction with bromobutyl, did not show evidence of rubber-black interaction.

The mixture shown in Table I containing bromobutyl and FEF black was also tested in a Mooney machine at a temperature of 135°C. This mixture was also mixed with 10 parts of a hydrocarbon process oil known as Zerice 45 (Zerice is a Trademark of Exxon) per 100 parts of bromobutyl and tested in a Mooney machine at a temperature of 160°C. The results of these two experiments are shown in Table II.

TABLE II

| Rubber Black | Bromobutyl FEF | |
|---|---|---|
| Oil | 10 | Nil |
| Test Temperature | 160°C | 135°C |
| Mooney at 1 min. | 28 | 66.5 |
| 4 min. | 25.5 | 59.5 |
| 8 min. | 27 | 59.5 |
| 12 min. | 32.5 | 59.5 |
| 16 min. | 55.5 | 61.5 |
| 20 min. | Not measured | 65 |
| 24 min. | Not measured | 74.5 |
| 28 min. | Not measured | 93 |

These results show that the bromobutyl black interaction occurs when a process oil is present in the mixture and that the interaction can occur at a temperature as low as 135°C for FEF carbon black.

EXAMPLE 2

A mixture was prepared of 100 parts of bromobutyl, 50 parts of GPF black and 1 part of stearic acid using the procedure of Example 1. A second mixture was prepared containing 100 parts of bromobutyl, 50 parts of GPF black, 1 part of stearic acid and 5 parts of channel black. These mixtures were tested in a Mooney machine at 160°C with the results shown in Table III.

TABLE III

| Rubber Black | GPF | Bromobutyl GPF + Channel |
|---|---|---|
| Mooney at 1 min. | 56.5 | 62.5 |
| 4 min. | 54.5 | 50.5 |
| 8 min. | 60 | 57.5 |
| 12 min. | 73 | 59.5 |
| 16 min. | 110 | 61 |
| 20 min. | 135 | 61.5 |
| 24 min. | 145 | 60 |
| 28 min. | 147 | 59.5 |

These results clearly show that the addition of channel black to a mixture of bromobutyl and GPF black essentially eliminates the interaction of the bromobutyl and the GPF black.

EXAMPLE 3

Mixtures were prepared, using the procedure of Example 1, of 100 parts of bromobutyl, 50 parts of FEF black, 1 part of stearic acid and 1 part of the boron compounds shown in Table IV. These mixtures were tested in a Mooney machine at 160°C.

TABLE IV

| Boron Compound | Boric Oxide | Ortho-boric Acid | Tri-butyl Borate |
|---|---|---|---|
| Mooney at 1 min. | 55 | 55.5 | 51.5 |
| 4 min. | 49.5 | 51 | 47.5 |
| 8 min. | 49 | 50 | 50.5 |
| 12 min. | 47 | 49 | 57.5 |

TABLE IV-continued

| Boron Compound | Boric Oxide | Ortho-boric Acid | Tri-butyl Borate |
|---|---|---|---|
| 16 min. | 46 | 48 | 60 |

Comparison of the results in Table IV with the results for the bromobutyl + FEF black mixture shown in Table I clearly shows that the boron compounds shown minimize or eliminate the bromo-butyl-FEF black interaction.

EXAMPLE 4

Mixtures were prepared, using the procedure of Example 1, of 100 parts of bromobutyl, 50 parts of FEF black, 1 part of stearic acid and 1 part of the acid anhydrides shown in Table V and the mixtures were tested in a Mooney machine at 160°C.

TABLE V

| Acid Anhydride | Maleic Anhydride | Succinic Anhydride | Phthalic Anhydride | Acetic Anhydride |
|---|---|---|---|---|
| Mooney at 1 min. | 56.5 | 56.5 | 59 | 59 |
| 4 min. | 52.5 | 52 | 54.5 | 52.5 |
| 8 min. | 51 | 52 | 53 | 55.5 |
| 12 min. | 50 | 51 | 52 | 55 |
| 16 min. | 49.5 | 50 | 50 | 54 |

These results show that these acid anhydrides minimize or eliminate the bromobutyl-FEF black interaction shown to occur in Example 1

Example 5

Compounds based on bromobutyl and containing interaction inhibitors were prepared using the mill mixing procedure of Example 1, vulcanized and the stress-strain properties of the vulcanizates were determined. The compositions used and results obtained are shown in Table VI.

TABLE VI

| Bromobutyl | parts | 100 | 100 | 100 |
|---|---|---|---|---|
| FEF carbon black | parts | 50 | 50 | 50 |
| Stearic acid | parts | 1 | 1 | 1 |
| Zinc oxide | parts | 5 | 5 | 5 |
| Phthalic Anhydride | parts | — | 1 | — |
| Ortho-boric acid | parts | — | — | 1 |
| Vulcanize by heating at 153°C for 40 minutes | | | | |
| Tensile Strength | kg/cm$^2$ | 125.5 | 113.5 | 125.5 |
| Elongation | % | 370 | 365 | 410 |
| 300% Modulus | kg/cm$^2$ | 102.5 | 95 | 90.5 |

These results show that the interaction retarding agents of this invention, as illustrated with phthalic anhydride and ortho-boric acid, do not seriously affect the properties of the vulcanizates when compared to a vulcanizate containing no agent.

What is claimed is:

1. An improved process for reducing the heat promoted interaction of brominated butyl and carbon blacks other than channel carbon black in which the brominated butyl containing from 0.5 to 5 weight percent of bromine and carbon black are mixed at temperatures from 135°C to about 180°C, characterized in that said mixing is in the presence of from 0.1 to 2 parts by weight per 100 parts by weight of brominated butyl of an interaction retarding agent selected from boron compounds having at least one oxygen atom chemically bonded to boron and selected from boron oxide, boric acid and borate esters of formula $R_3O—B(OR_2)—OR_1$, wherein $R_1$, $R_2$ and $R_3$ may be the same or different and are $C_1$–$C_{12}$ hydrocarbyl radicals.

* * * * *